United States Patent
Satyaseelan

(10) Patent No.: US 11,407,299 B2
(45) Date of Patent: Aug. 9, 2022

(54) HYBRID MODULE

(71) Applicant: Schaeffler Technologies AG & Co. KG, Herzogenaurach (DE)

(72) Inventor: Ayyalraju Satyaseelan, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/123,188

(22) Filed: Dec. 16, 2020

(65) Prior Publication Data

US 2021/0237551 A1 Aug. 5, 2021

Related U.S. Application Data

(60) Provisional application No. 62/970,437, filed on Feb. 5, 2020.

(51) Int. Cl.
| | |
|---|---|
| *B60K 6/48* | (2007.10) |
| *F16H 41/24* | (2006.01) |
| *B60K 6/387* | (2007.10) |

(52) U.S. Cl.
CPC .............. *B60K 6/387* (2013.01); *B60K 6/48* (2013.01); *F16H 41/24* (2013.01); *B60K 2006/4825* (2013.01)

(58) Field of Classification Search
CPC .................... B60K 6/20–547; F16H 2045/002
See application file for complete search history.

(56) References Cited

U.S. PATENT DOCUMENTS

| | | | | |
|---|---|---|---|---|
| 6,425,838 | B1 * | 7/2002 | Matsubara | F02B 63/04 475/5 |
| 9,246,369 | B2 * | 1/2016 | Tamai | H02K 9/19 |
| 2007/0278876 | A1 * | 12/2007 | Haga | H02K 3/325 310/71 |
| 2012/0242186 | A1 * | 9/2012 | Hattori | H02K 1/185 310/216.118 |
| 2020/0040974 | A1 | 2/2020 | Payne et al. | |

FOREIGN PATENT DOCUMENTS

| | | | | |
|---|---|---|---|---|
| CN | 204947807 U | * | 1/2016 | |
| DE | 102010012707 A1 | * | 12/2010 | B60K 6/405 |
| DE | 102012219211 A1 | * | 6/2013 | B60K 6/387 |
| JP | 2009296718 A | * | 12/2009 | H02K 11/40 |

* cited by examiner

*Primary Examiner* — Ernesto A Suarez
*Assistant Examiner* — Lillian T Nguyen

(57) ABSTRACT

A stator assembly for a hybrid module includes a stator carrier, a stator segment, and a water jacket. The stator carrier has an inner cylindrical surface and the stator segment is installed in the inner cylindrical surface. The water jacket is fixed to the stator carrier to enclose a sealed chamber therebetween. The water jacket may be fixed to the stator carrier by a pair of circumferential welds at opposite ends of the sealed chamber. The stator assembly may include a fluid port fixed to the water jacket and arranged to guide a fluid into or out of the sealed chamber to cool the stator assembly.

15 Claims, 1 Drawing Sheet

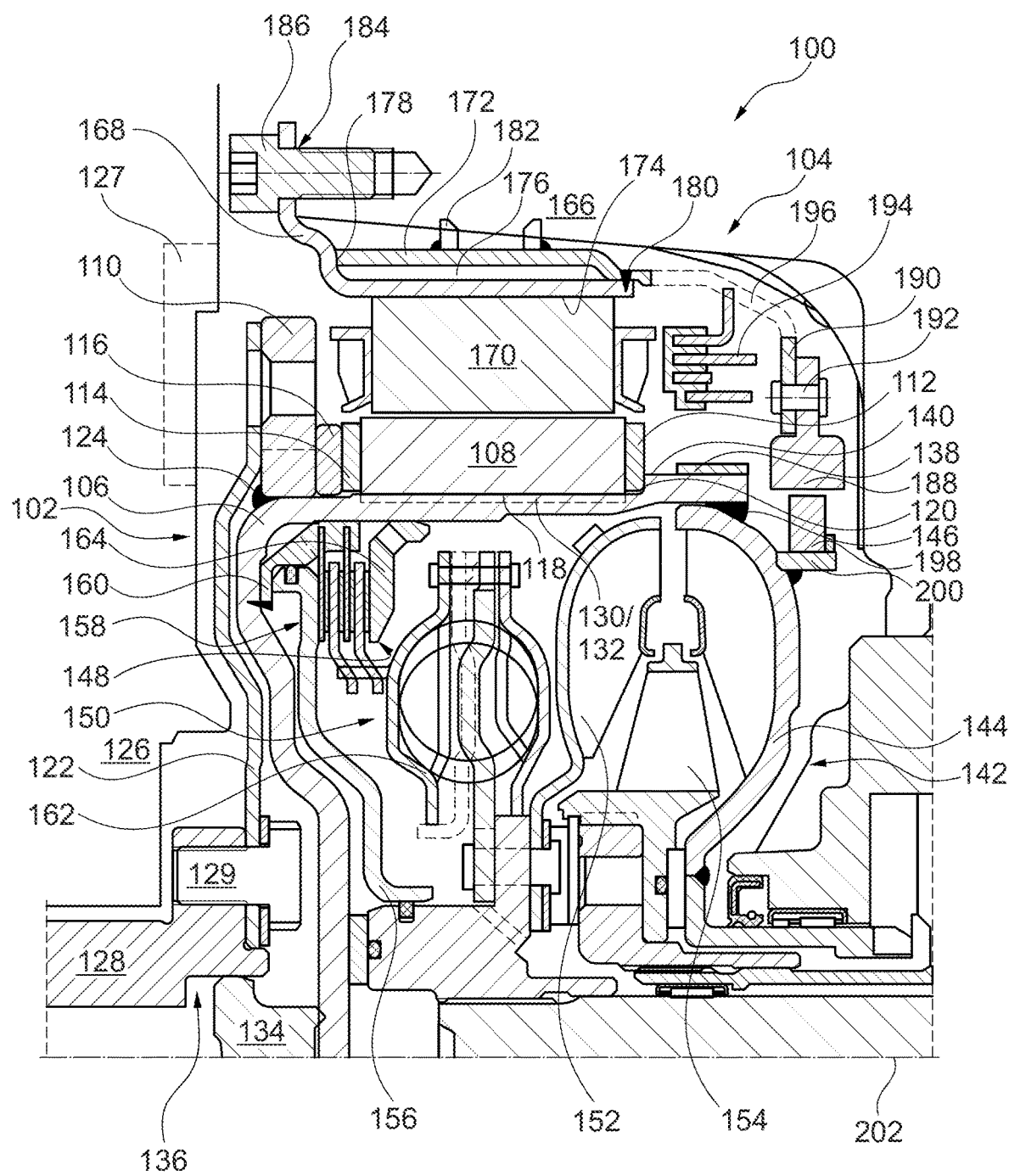

HYBRID MODULE

CROSS-REFERENCE TO RELATED APPLICATIONS

This application claims the benefit of U.S. Provisional Patent Application No. 62/970,437, filed Feb. 5, 2020, the disclosure of which is incorporated in its entirety by reference herein.

TECHNICAL FIELD

The present disclosure relates generally to a hybrid module, and more specifically to a stator assembly for a hybrid module.

BACKGROUND

Hybrid modules are known. One example is shown in commonly-assigned United States Patent Application Publication No. 2020/0040974 to Payne et al., titled HYBRID MODULE CONFIGURATION, hereby incorporated by reference as if set forth fully herein.

SUMMARY

Example embodiments broadly comprise a stator assembly for a hybrid module including a stator carrier, a stator segment, and a water jacket. The stator carrier includes an inner cylindrical surface, the stator segment is installed in the inner cylindrical surface, and the water jacket is fixed to the stator carrier to enclose a sealed chamber therebetween. In an example embodiment, the water jacket is fixed to the stator carrier by a pair of circumferential welds at opposite ends of the sealed chamber. In an example embodiment, the stator assembly includes a fluid port fixed to the water jacket and arranged to guide a fluid into or out of the sealed chamber to cool the stator assembly. In an example embodiment, the stator carrier or the water jacket is arranged for fixing the stator assembly to a transmission case for a multi-speed planetary transmission.

In some example embodiments, the stator assembly includes a resolver stator. The stator carrier or the water jacket includes an extension, and the resolver stator is fixed to the extension. In an example embodiment, the resolver stator is fixed to the extension by riveting. In an example embodiment, the stator assembly has a high voltage bus bar electrically connected to the stator segment and the extension includes an opening for connecting the high voltage bus bar to a high voltage transmission connector. In an example embodiment, the stator segment is installed in the inner cylindrical surface by shrink fitting.

In an example embodiment, the stator assembly includes a resolver stator. The water jacket is disposed radially outside of the stator carrier and fixed to the stator carrier by a pair of circumferential welds at opposite ends of the sealed chamber. The water jacket includes an extension extending axially away from the stator segment and radially inward, and the resolver stator is riveted to the extension.

Other example embodiments broadly comprise a hybrid module including the stator assembly, and a rotor assembly disposed radially inside of the stator assembly. The rotor assembly includes a rotor carrier, a torque converter impeller fixed to the rotor carrier, and a resolver rotor fixed to the torque converter impeller and axially aligned with the resolver stator.

BRIEF DESCRIPTION OF THE DRAWINGS

The single figure illustrates a top-half cross-sectional view of a hybrid module according to an example aspect of the present disclosure.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

The single figure illustrates a top-half cross-sectional view of hybrid module 100 according to an example aspect of the present disclosure. Hybrid module 100 includes rotor assembly 102 and stator assembly 104. Rotor assembly 102 includes rotor carrier 106, rotor segment 108, end ring 110, spacer 112, spacer 114, and compressed spring 116. Rotor carrier 106 includes outer cylindrical surface 118 and radial surface, or shoulder, 120. The rotor segment is installed on outer cylindrical surface 118. Segment 108 may be a stack of segments, for example. The end ring is fixed to the rotor carrier and arranged for fixing to engine flexplate 122. Spacer 112 is disposed axially between the rotor segment and the radial surface, and spacer 114 is disposed axially between the rotor segment and the end ring.

The compressed spring is disposed axially between the end ring and spacer 114, and applies a rotor clamping force to press spacers 112 and 114, and the rotor segment, against the radial surface for frictional torque transmission between the rotor segment and the rotor carrier. That is, during assembly, the rotor carrier is axially held and the spring is compressed by a force pressing on the end ring. Once the desired compression force is achieved, the end ring is fixed to the rotor carrier by weld 123. Some embodiments (not shown) may include select fit shimming or machining to reduce variation of a flex plate connection location on the end ring due to tolerances from stacked rotor segments.

The compressed spring is a thick Belleville spring or a thick diaphragm spring that is compressed to flat, for example. Each of spacers 112 and 114 include a non-magnetic material. For example, spacers 112 and 114 may be made from a metal such as brass, stainless steel or aluminum, or a nonmetallic material such as plastic, a polymer, or a ceramic. Although certain materials are listed as examples, spacers 112 and 114 may be made from other non-magnetic materials.

End ring 110 includes threaded holes 124 for receiving bolts (not shown) for fixing the engine flexplate to the end ring. Other embodiments (not shown) may include studs (not shown) fixed to the end ring for receiving nuts for fixing the engine flexplate to the end ring. Engine block 126 includes access hatch 127 for securing the bolts or nuts to secure the rotor carrier to the engine flexplate. Flexplate 122 is fixed to engine crankshaft 128 by bolts 129. As shown in the figure, holes 124 are disposed radially outside of outer cylindrical surface 118.

Rotor segment 108 includes key 130 and rotor carrier 106 includes keyway 132. The key is disposed in the keyway to rotationally position the rotor segment relative to the rotor carrier. Other embodiments (not shown) may include the key in the rotor carrier and the keyway in the rotor segment, for example. The rotor assembly includes pilot 134 fixed to the rotor carrier for positioning the rotor assembly in engine crankshaft bore 136, and balance weight 138 fixed to outer cylindrical surface 140 of rotor carrier 106.

The hybrid module includes torque converter assembly 142 including torque converter impeller 144 is fixed to the rotor carrier at weld 146, for example. The impeller and rotor carrier form a housing for the torque converter. Lockup clutch 148, damper 150, turbine 152 and torque converter stator 154 are disposed within the housing. Lockup clutch 148 includes piston 156 and clutch plates 158 for torque transmission between the rotor carrier and the damper. Some of the clutch plates are drivingly engaged with the rotor carrier through drive ring 160, fixed to the rotor carrier and sealed to the piston, and other clutch plates are drivingly engaged with the damper through cover plate 162. Backing plate 164, fixed to the rotor carrier, reacts axial force from piston 156 when the lockup clutch is engaged.

Stator assembly 104 is disposed radially outside of the rotor assembly and is fixed to transmission case 166 for a multi-speed planetary transmission. Stator assembly 104 includes stator carrier 168, stator segment 170, and water jacket 172. Stator segment 170 may be a stack of stator segments, for example. The stator carrier includes inner cylindrical surface 174 and the stator segment is installed in the inner cylindrical surface by shrink fitting, for example. In other words, the stator carrier is heated to expand the inner cylindrical surface and the stator segment is installed. Once the stator carrier cools, the inner cylindrical surface shrink fits to the stator segment. The water jacket is fixed to the stator carrier to enclose sealed chamber 176 therebetween. The water jacket is fixed to the stator carrier by circumferential welds 178 and 180 at opposite ends of the sealed chamber and axially outside of stator segment 170. Welds 178 and 180 may be laser welds, for example.

Stator assembly 104 includes fluid port 182 fixed to the water jacket and arranged to guide a fluid into or out of the sealed chamber to cool the stator assembly. That is, the fluid port can be connected to a tube or hose that circulates a cooling fluid (e.g., water) through the sealed chamber to extract heat from the stator assembly. The fluid can be constantly circulated or only circulated when the temperature of the stator assembly exceeds a threshold value. A circulation rate of the fluid may also be adjusted based on a temperature of the stator assembly of an electrical power consumption of the hybrid module, for example.

Stator carrier 168 is arranged for fixing the stator assembly to the transmission case. That is, stator carrier 168 includes aperture 184 for receiving bolt 186 threaded into the transmission case to secure the components. Although, the stator carrier is shown fixing the stator assembly to the transmission case, the water jacket may fix the stator assembly to the transmission case in a similar manner in other embodiments (not shown).

Stator assembly 104 includes resolver stator 188. The water jacket includes extension 190 extending axially away from the stator segment and radially inward, and the resolver stator is fixed to the extension. Although the extension is shown extending from the water jacket, other embodiments (not shown) may include the extension extending from the stator carrier. As shown in the figure, the resolver stator is fixed to the extension by rivet 192 although other fixing methods (e.g., bolting, staking, adhesives) may be employed in other embodiments (not shown). Stator assembly 104 includes high voltage bus bar 194 electrically connected to the stator segment, and the extension includes opening 196 for connecting the high voltage bus bar to a high voltage transmission connector (not shown).

Stator assembly 104 also includes resolver rotor 198 fixed to torque converter impeller 144. As shown in the figure, impeller 144 includes ring 200 fixed to the impeller and resolver rotor 198 staked to the ring. Resolver rotor 198 is axially aligned with the resolver stator. In other words, a line can be drawn normal to axis 202 that extends through both resolver stator 188 and resolver rotor 198.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS

100 Hybrid module
102 Rotor assembly
104 Stator assembly
106 Rotor carrier
108 Rotor segment
110 End ring
112 Spacer (first)

114 Spacer (second)
116 Compressed spring
118 Outer cylindrical surface (first)
120 Radial surface
122 Engine flexplate
123 Weld (end ring/rotor carrier)
124 Threaded holes
126 Engine block
127 Access hatch
128 Engine crankshaft
129 Bolts (crankshaft/flexplate)
130 Key
132 Keyway
134 Pilot
136 Engine crankshaft bore
138 Balance weight
140 Outer cylindrical surface (second)
142 Torque converter assembly
144 Torque converter impeller
146 Weld (impeller/rotor carrier)
148 Lockup clutch
150 Damper
152 Turbine
154 Torque converter stator
156 Piston
158 Clutch plates
160 Drive ring
162 Cover plate
164 Backing plate
166 Transmission case
168 Stator carrier
170 Stator segment
172 Water jacket
174 Inner cylindrical surface
176 Sealed chamber
178 Circumferential weld
180 Circumferential weld
182 Fluid port
184 Aperture
186 Bolt
188 Resolver stator
190 Extension
192 Rivet
194 High voltage bus bar
196 Opening
198 Resolver rotor
200 Ring
202 Axis

What is claimed is:

1. A stator assembly for a hybrid module comprising:
a stator carrier comprising an inner cylindrical surface;
a stator segment installed in the inner cylindrical surface; and
a water jacket is welded to the stator carrier to enclose a sealed chamber therebetween, wherein:
the stator carrier or the water jacket comprises a radial wall with an aperture; and
the stator assembly is secured to a transmission case for a multi-speed planetary transmission by a fastener installed in the aperture.

2. The stator assembly of claim 1 wherein the water jacket is welded to the stator carrier by a pair of circumferential welds at opposite ends of the sealed chamber.

3. The stator assembly of claim 1 further comprising a fluid port fixed to the water jacket and arranged to guide a fluid into or out of the sealed chamber to cool the stator assembly.

4. The stator assembly of claim 1 further comprising a resolver stator, wherein:
the stator carrier or the water jacket comprises an extension; and
the resolver stator is fixed to the extension.

5. The stator assembly of claim 4 wherein the resolver stator is fixed to the extension by riveting.

6. The stator assembly of claim 4 further comprising a high voltage bus bar electrically connected to the stator segment, wherein:
the extension comprises an opening for connecting the high voltage bus bar to a high voltage transmission connector.

7. The stator assembly of claim 1 wherein the stator segment is installed in the inner cylindrical surface by shrink fitting.

8. The stator assembly of claim 1 further comprising a resolver stator, wherein:
the water jacket is disposed radially outside of the stator carrier and fixed to the stator carrier by a pair of circumferential welds at opposite ends of the sealed chamber;
the water jacket comprises an extension extending axially away from the stator segment and radially inward; and
the resolver stator is riveted to the extension.

9. A hybrid module comprising:
the stator assembly of claim 8;
a rotor assembly disposed radially inside of the stator assembly, the rotor assembly comprising:
a rotor carrier;
a torque converter impeller fixed to the rotor carrier; and
a resolver rotor fixed to the torque converter impeller and axially aligned with the resolver stator.

10. A hybrid module comprising:
a stator assembly comprising:
a stator carrier comprising an inner cylindrical surface;
a stator segment installed in the inner cylindrical surface;
a water jacket fixed to the stator carrier to enclose a sealed chamber therebetween, the water jacket or the stator carrier comprising an extension extending axially away from the stator segment and radially inward; and
a resolver stator fixed to the extension; and
a rotor assembly comprising:
a rotor carrier;
a torque converter impeller fixed to the rotor carrier; and
a resolver rotor fixed to the torque converter impeller and axially aligned with the resolver stator.

11. The hybrid module of claim 10, wherein the water jacket is disposed radially outside of the stator carrier and fixed to the stator carrier by a pair of circumferential welds at opposite ends of the sealed chamber.

12. The hybrid module of claim 10 wherein:
the water jacket comprises the extension; and
the resolver stator is riveted to the extension.

13. The hybrid module of claim 10 further comprising a fluid port fixed to the water jacket and arranged to guide a fluid into or out of the sealed chamber to cool the stator assembly.

14. The hybrid module of claim 10, wherein:
the stator assembly further comprises a high voltage bus bar electrically connected to the stator segment; and the extension comprises an opening for connecting the high voltage bus bar to a high voltage transmission connector.

15. The hybrid module of claim 10, wherein the stator assembly is secured to a transmission case for a multi-speed planetary transmission.

* * * * *